(12) United States Patent
Blanchard et al.

(10) Patent No.: US 11,172,257 B2
(45) Date of Patent: Nov. 9, 2021

(54) MANAGING AUDIO AND VIDEO CONTENT BLOCKING

(71) Applicant: Sony Corporation, Tokyo (JP)

(72) Inventors: Robert Blanchard, Escondido, CA (US); Adam Goldberg, Fairfax, VA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/438,148

(22) Filed: Jun. 11, 2019

(65) Prior Publication Data
US 2020/0396505 A1    Dec. 17, 2020

(51) Int. Cl.
*H04N 21/454* (2011.01)
*H04N 21/466* (2011.01)
*G06F 16/41* (2019.01)
*H04N 21/475* (2011.01)

(52) U.S. Cl.
CPC ........... *H04N 21/454* (2013.01); *G06F 16/41* (2019.01); *H04N 21/466* (2013.01); *H04N 21/4755* (2013.01)

(58) Field of Classification Search
CPC .... G06F 16/41; H04N 21/454; H04N 21/466; H04N 21/4755
See application file for complete search history.

(56) References Cited

U.S. PATENT DOCUMENTS

| | | | | |
|---|---|---|---|---|
| 6,829,582 B1 * | 12/2004 | Barsness | ............ | H04N 21/4542 704/275 |
| 6,850,252 B1 * | 2/2005 | Hoffberg | ............ | H04N 21/4318 348/E7.061 |
| 2002/0116629 A1 * | 8/2002 | Bantz | ............ | G06Q 30/02 726/26 |
| 2002/0147782 A1 * | 10/2002 | Dimitrova | ............ | H04N 21/4542 709/207 |
| 2007/0204288 A1 * | 8/2007 | Candelore | ............ | H04N 7/163 725/28 |
| 2007/0250863 A1 | 10/2007 | Ferguson | | |
| 2009/0328105 A1 * | 12/2009 | Craner | ............ | H04N 21/4667 725/46 |
| 2012/0151217 A1 * | 6/2012 | Porter | ............ | H04N 21/84 713/178 |
| 2012/0210342 A1 * | 8/2012 | Gonzalez | ............ | H04N 21/4532 725/25 |
| 2015/0067717 A1 * | 3/2015 | Oliver | ............ | H04N 21/4542 725/28 |

(Continued)

*Primary Examiner* — Randy A Flynn
(74) *Attorney, Agent, or Firm* — Trellis IP Law Group, PC (57) ABSTRACT

Implementations generally relate to managing audio and video content blocking. In some implementations, a method includes receiving a media item at a media device. The method further includes accessing content information associated with the media item. The method further includes determining a plurality of content categories based on the content information. The method further includes analyzing the content information based on the plurality of content categories. The method further includes comparing analysis results from the analyzing of the content information to a plurality of objectionability thresholds. The method further includes blocking the media item from being played on the media device if the analysis results exceed one or more objectionability thresholds of the plurality of objectionability thresholds.

18 Claims, 6 Drawing Sheets

(56) References Cited

U.S. PATENT DOCUMENTS

| | | | |
|---|---|---|---|
| 2015/0312649 A1* | 10/2015 | Gopalan | H04N 21/458 725/32 |
| 2016/0162576 A1* | 6/2016 | Arino de la Rubia | G06N 7/005 707/739 |
| 2018/0176641 A1 | 6/2018 | Yun et al. | |

* cited by examiner

MANAGING AUDIO AND VIDEO CONTENT BLOCKING

CROSS REFERENCE TO RELATED APPLICATIONS

This application related to U.S. patent application Ser. No. 16/438,142, entitled "DETERMINING CONTENT ADVISORY INFORMATION," filed Jun. 11, 2019, which is hereby incorporated by reference as if set forth in full in this application for all purposes.

BACKGROUND

Media content shown to viewers at a movie theater or on television are typically associated with content ratings. For example, media content is typically rated on specific, defined characteristics such as violence, sexual content, etc. Example content ratings for movies may include G, PG, PG-13, R, etc. Example content ratings for television may include, for example, TV-G, TV-PG, TV-14, TV-MA, etc. Content rating information is typically created manually by a person who is involved in the production or distribution of the media content, which results in subjective ratings. Consequently, media content is often not accurately rated, and thus less helpful to users such as parents who monitor what media content their children view. For example, a rating might not accurately reflect the content (e.g., a sexually explicit program may be given a TV-14-S rating, a child friendly program may be given a TV-MA rating for a reference to mild adult content, etc.).

SUMMARY

Implementations generally relate to managing audio and video content blocking. In some implementations, a system includes one or more processors, and includes logic encoded in one or more non-transitory computer-readable storage media for execution by the one or more processors. When executed, the logic is operable to cause the one or more processors to perform operations including receiving a media item at a media device; accessing content information associated with the media item; determining a plurality of content categories based on the content information; analyzing the content information based on the plurality of content categories; comparing analysis results from the analyzing of the content information to a plurality of objectionability thresholds; and blocking the media item from being played on the media device if the analysis results exceed one or more objectionability thresholds of the plurality of objectionability thresholds.

With further regard to the system, in some implementations, the content information comprises video content and audio content. In some implementations, the content information comprises captions. In some implementations, the content information comprises metadata. In some implementations, the analyzing of the content information is based on one or more of artificial intelligence techniques, natural language processing techniques, and automated video processing techniques. In some implementations, the analyzing of the content information comprises generating a plurality of values for the plurality of content categories. In some implementations, the logic when executed is further operable to cause the one or more processors to perform operations comprising enabling a user to set the one or more objectionability thresholds of the plurality of objectionability thresholds.

In some embodiments, a non-transitory computer-readable storage medium with program instructions thereon is provided. When executed by one or more processors, the instructions are operable to cause the one or more processors to perform operations including receiving a media item at a media device. The method further includes accessing content information associated with the media item. The method further includes determining a plurality of content categories based on the content information. The method further includes analyzing the content information based on the plurality of content categories. The method further includes comparing analysis results from the analyzing of the content information to a plurality of objectionability thresholds. The method further includes blocking the media item from being played on the media device if the analysis results exceed one or more objectionability thresholds of the plurality of objectionability thresholds.

With further regard to the computer-readable storage medium, in some implementations, the content information comprises video content and audio content. In some implementations, the content information comprises captions. In some implementations, the content information comprises metadata. In some implementations, the analyzing of the content information is based on one or more of artificial intelligence techniques, natural language processing techniques, and automated video processing techniques. In some implementations, the analyzing of the content information comprises generating a plurality of values for the plurality of content categories. In some implementations, the instructions when executed are further operable to cause the one or more processors to perform operations comprising enabling a user to set the one or more objectionability thresholds of the plurality of objectionability thresholds.

In some implementations, a method includes receiving a media item at a media device. The method further includes accessing content information associated with the media item. The method further includes determining a plurality of content categories based on the content information. The method further includes analyzing the content information based on the plurality of content categories. The method further includes comparing analysis results from the analyzing of the content information to a plurality of objectionability thresholds. The method further includes blocking the media item from being played on the media device if the analysis results exceed one or more objectionability thresholds of the plurality of objectionability thresholds.

With further regard to the method, in some implementations, the content information comprises video content and audio content. In some implementations, the content information comprises captions. In some implementations, the content information comprises metadata. In some implementations, the analyzing of the content information is based on one or more of artificial intelligence techniques, natural language processing techniques, and automated video processing techniques. In some implementations, the analyzing of the content information comprises generating a plurality of values for the plurality of content categories.

A further understanding of the nature and the advantages of particular implementations disclosed herein may be realized by reference of the remaining portions of the specification and the attached drawings.

DETAILED DESCRIPTION

Implementations described herein generally relate to determining content advisory information. In some implementations, a system accesses content information associated with a media item such as a movie or television program. The system then determines content categories based on the content information. Such content categories may include, for example, violence, sex, etc. As described in more detail herein, in various implementations, the system analyzes the content information based on the content categories. The system then generates a content advisory recommendation based on the analyzing of the content information. Example content advisory recommendations may include ratings such as G, PG, R, etc. for movies, or TV-G, TV-PG, TV-TV-MA, etc. for television programs.

Implementations described herein also generally relate to managing audio and video content blocking. In some implementations, a system such as a media device receives a media item, and accesses content information associated with the media item. The system further determines content categories based on the content information, and analyzes the content information based on the content categories. As described in more detail below, the system compares the analysis results to objectionability thresholds. The system may then block the media item from being played if the analysis results exceed one or more of the objectionability thresholds.

Figure 1:
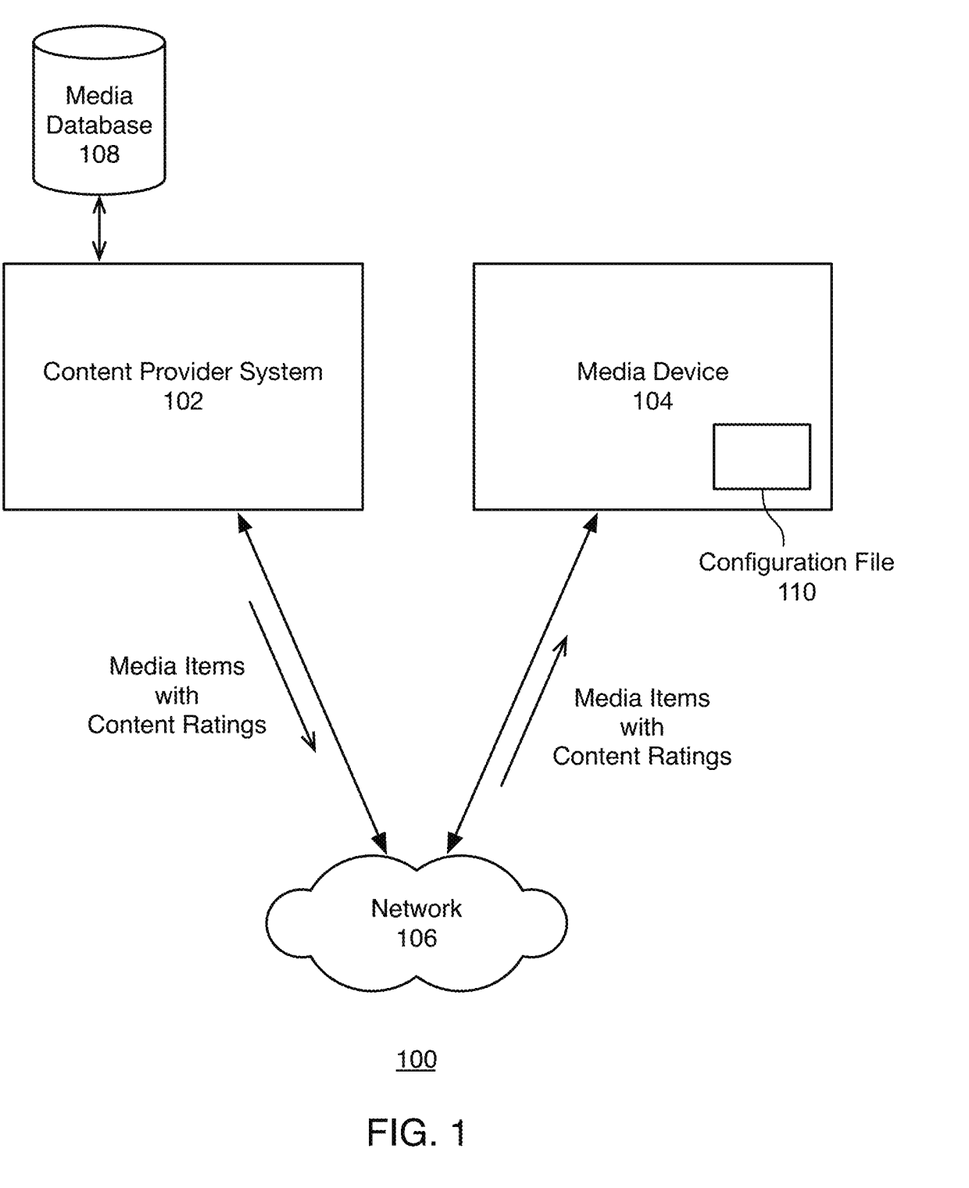
FIG. 1 is a block diagram of an example environment for generating content advisory recommendations and for managing audio and video content blocking, which may be used for implementations described herein.

FIG. 1 is a block diagram of an example environment 100 for generating content advisory recommendations and for managing audio and video content blocking, which may be used for implementations described herein. As shown, environment 100 includes a content provider system 102 and a media device 104, which may communicate with each other via a network 106. In some implementations, network 106 may be the Internet. In some implementations, network 106 may include a combination of networks such as the Internet, a wide area network (WAN), a local area network (LAN), a Wi-Fi network, a Bluetooth network, near-field communication (NFC) network, cable network, over-the-air broadcast, etc.

In various implementations, content provider system 102 accesses media content items from any suitable source such as media database 108. As shown in the particular example, content provider system 102 accesses media content items from media database 108, which is external to content provider system 102. Alternatively, media database 108 may be integrated with or internal to content provider system 102. As described in more detail herein, content provider system 102 intelligently analyzes the content of media items such as movies and television programs in order to generate content advisory recommendations. In some scenarios, a user of content provider system 102 may use a content advisory recommendation as the content rating for a given media content item. In some scenarios, the user of content provider system 102 may compare a content advisory recommendation to an existing content rating for a given media content item and then decide on the content rating based on the comparison. Content provider system 102 sends media items with content ratings to media devices such as media device 104.

As shown, media device 104 stores a configuration file 110, which contains user preferences. As described in more detail herein, media device 104 enables a user to set user preferences for blocking media items that may be offensive to the user, family members of the user, friends or housemates of the user, etc. In this example implementation, configuration file 110 is stored on media device 104. Alternatively, in some implementations, media device 104 may also access a configuration file with user preferences remotely (e.g., from the cloud, etc.). In some implementations, the system may enable user preferences to be set once for all devices accessing the configuration file in the cloud or wherever the file is stored on the network.

In various implementations, media device 104 may be a television or may be another media device such as a set-top box that is separate from a television. Media device 104 may control what media items get played on a television. In various embodiments, media device 104 may be a device that has a screen (e.g., a computer, tablet, smartphone, etc.), in which case media device 104 may control what media items it plays.

Figure 2:
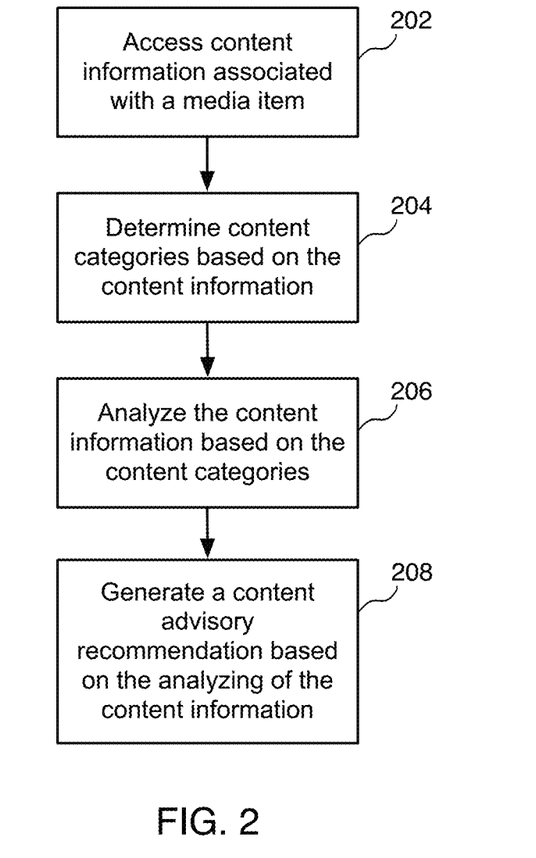
FIG. 2 is an example flow diagram for generating content advisory recommendations, according to some implementations.

FIG. 2 is an example flow diagram for generating content advisory recommendations, according to some implementations. Referring to both FIGS. 1 and 2, a method is initiated at block 202, where a system such as content provider system 102 accesses content information associated with a media item. For ease of illustration, some example implementations are described in the context of a single media item. These implementations and other also apply to multiple media items.

In various implementations, the content information includes video content and audio content. In some implementations, the content information may include captions, which include text that represents spoken dialog. In some implementations, the content information comprises metadata. Such metadata may include information about the particular media item such as the title, synopsis, an existing content rating, etc.

At block 204, the system determines content categories based on the content information. In some implementations, the content categories may be predetermined. Example content categories may include language, violence, sex, etc. In some implementations, the system may determine content categories in real-time based on the content information. For example, the system may determine from key words in the title and/or description and/or metadata that a given movie is a war movie and would be likely to have violence, etc. As such, the system may include violence as a category.

At block 206, the system analyzes the content information based on the content categories. In some implementations, the system may analyze metadata of the content information to predict characteristics of a given media item. For example, the system may analyze the title of a media item, a description of the media content, the director, and the actors to determine and/or predict characteristics or attributes of the content of the media item. For example, the title and/or description may include words indicating a propensity for violence.

In various implementations, to analyze the content information the system may generate values for content categories. In various implementations, the system may process the content information (e.g., closed-caption data and/or spoken dialog, video images, metadata, etc.) to yield a value corresponding to potentially objectionable content.

In some implementations, for a given media item, the system may associate numerical scales with the content categories. For example, such a numerical scale may be a 0-10 scale. The system also determines and associates a value with each of the numerical scales for each category. For example, a low numerical value such as a "0" or a "1" for a violence category may indicate no violence or little violence. In contrast, a high numerical value such as a "9" or a "10" for a violence category may indicate an extreme amount of violence.

In some implementations, a given content rating may be for video content, for audio content, and/or for a combination of the video content and audio content for a given media item. This would be helpful for some end-users who are particularly concerned about objectionable visual images, or particularly concerned about objectionable language, or a combination thereof.

In various implementations, the system may analyze the content information based on one or more analysis techniques or a combination thereof. For example, in some implementations the system may analyze the content information based on artificial intelligence (AI) techniques, including neural networks. In some implementations the system may analyze the content information is based on natural language processing techniques. For example, the system may user use AI and/or natural language processing techniques to determine meanings of words in order to identify words that may be objectionable. In some implementations the system may analyze the content information is based on automated video processing techniques. For example, the system may user use AI and/or automated video processing techniques to identify images that may be objectionable.

At block 208, the system generates a content advisory recommendation based on the analyzing of the content information. In various implementations, the content advisory recommendation may include at least one of a movie rating and a television rating. As indicated above, a user of the content provider system may use a content advisory recommendation as the content rating for a given media content item. For example, in some scenarios, the user may compare a content advisory recommendation to an existing content rating for a given media content item, and then decide on the content rating based on the comparison. For example, the user may ignore the existing rating and go with the content advisory recommendation. Alternatively, the user may use both the content advisory recommendation and an existing rating and bias the ultimate rating with one weighted more than the other. For example, the user may give the content advisory recommendation more weight that the existing rating. Such a user may be someone representing any audio, video, or audiovisual programming provider (e.g., television broadcast station, online provider, etc.). As a result, the system achieves more accurate and useful content ratings for facilitating end-users in selectively blocking particular media items (e.g., media items with objectionable content). In another application, the content advisory recommendation or resulting content rating may be used for programming a v-chip or other device for selectively blocking media items.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
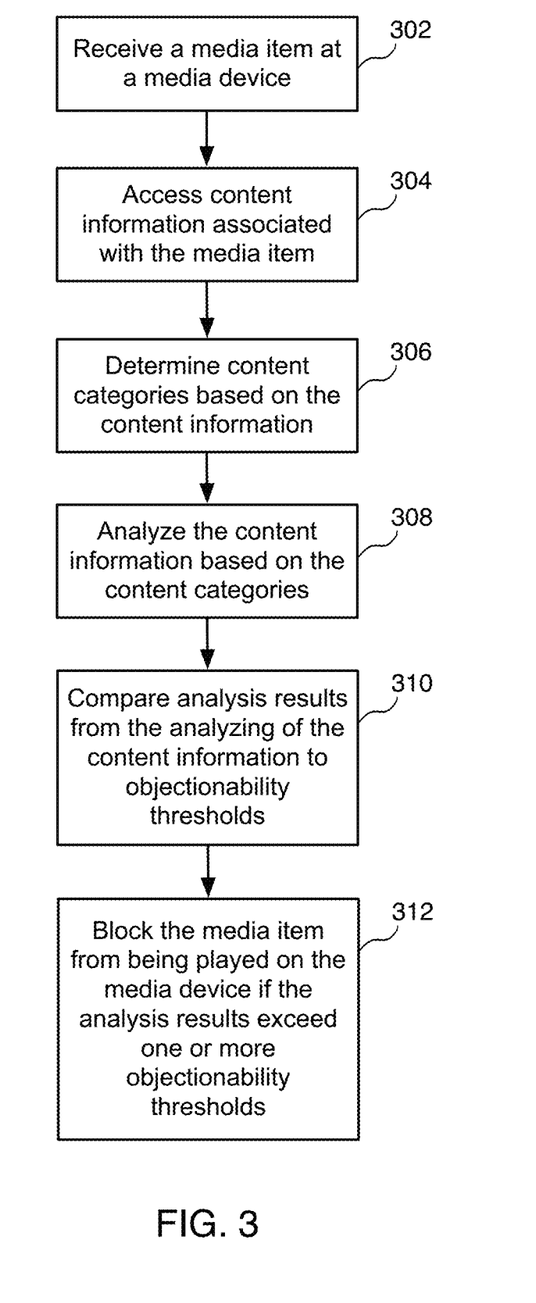
FIG. 3 is an example flow diagram for managing audio and video content blocking, according to some implementations.

FIG. 3 is an example flow diagram for managing audio and video content blocking, according to some implementations. As described in more detail below, the system intelligently blocks objectionable audio-visual content for users. For ease of illustration, some example implementations are described in the context of a single media item. These implementations and other also apply to multiple media items. Referring to both FIGS. 1 and 3, a method is initiated at block 302, where a system such as media device 104 receives a media item.

As indicated above, in various implementations, the content information includes video content and audio content. In some implementations, the content information may include captions, which include text that represents spoken dialog. In some implementations, the content information comprises metadata.

At block 304, the system accesses content information associated with the media item. In some implementations, the system may access the content information from the file in which the media content item is stored. In some implementations, the system may access the content information separately from the file in which the media content item is stored. For example, the system may access content information from the content provider system or from elsewhere in the cloud.

At block 306, the system determines content categories based on the content information. In various implementations, the system may determine content categories using similar techniques described in connection with block 204 of FIG. 2.

At block 308, the system analyzes the content information based on the content categories. In various implementations, similar to block 206 of FIG. 2, the system may analyze the content information based on one or more analysis techniques such as artificial intelligence techniques including neural networks, natural language processing techniques, automated video processing techniques, or combination thereof.

In various implementations, to analyze the content information the system may generate values for the content categories. The system may analyze content information, including generating values for content categories based on similar techniques described in connection with block 206 of FIG. 2.

At block 310, the system compares analysis results from the analyzing of the content information to a plurality of objectionability thresholds. In various implementations, the system enables a user to set the one or more objectionability thresholds. Example implementations directed to objectionability thresholds are described in more detail below in connection with FIG. 4.

At block 312, the system blocks the media item from being played on the media device if the analysis results exceed one or more of the objectionability thresholds. Implementations may be applied to individual users, families, housemates, etc. Implementations may also facilitate those who may be blind and/or hard of hearing to utilize the content blocking capability.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
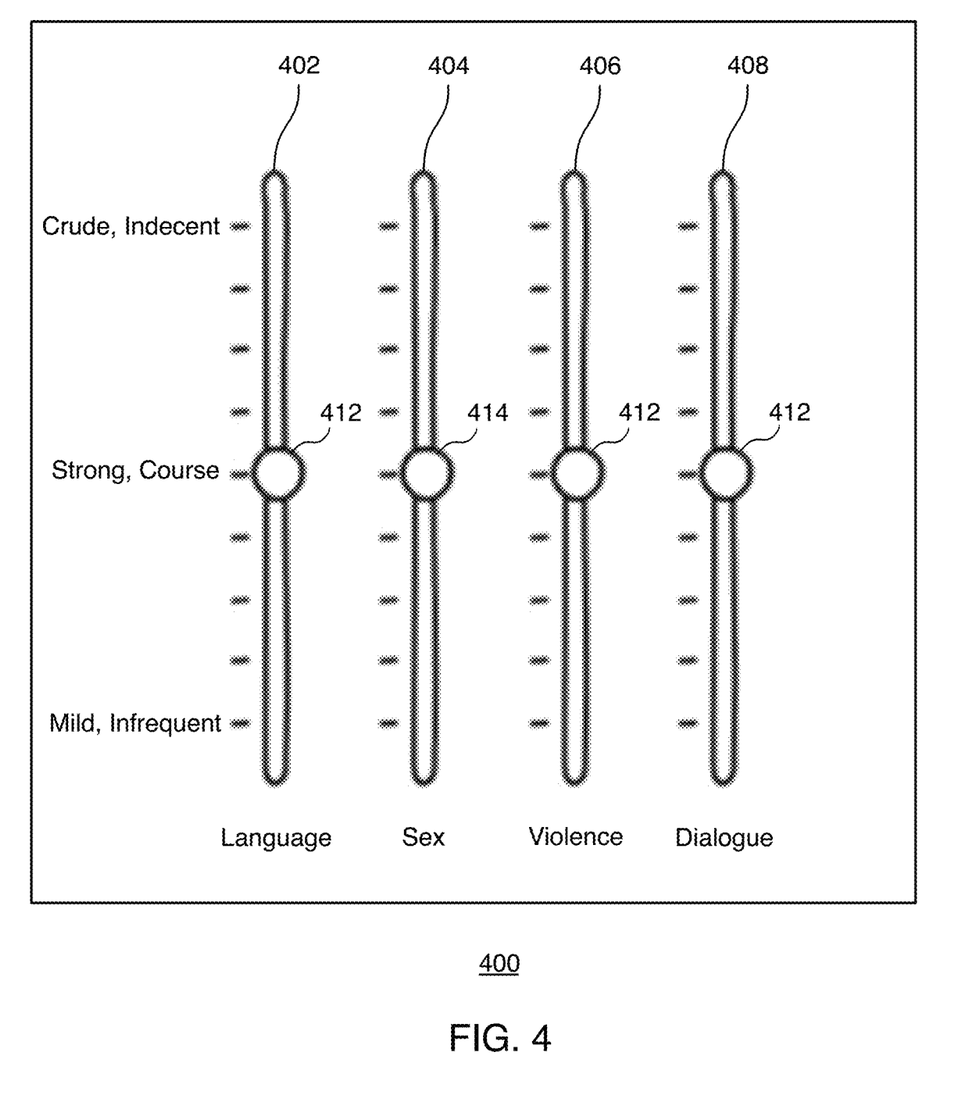
FIG. 4 is an example user interface for managing audio and video content blocking, according to some implementations.

FIG. 4 is an example user interface for managing audio and video content blocking, according to some implementations. Shown are slider bars for different categories. In this particular example, slider bar 402 corresponds to the language category. Slider bar 404 corresponds to the sex category. Slider bar 406 corresponds to the violence category. Slider bar 406 corresponds to the dialogue category. For ease of illustration, four categories are shown.

As shown, the upper portion of slider bars 402, 404, 406, and 408 correspond to higher numeric values associated with crude and/or indecent degrees of a given category. Furthermore, the middle portion of slider bars 402, 404, 406, and 408 correspond to mid-range numeric values associated with strong and/or course degrees of a given category. Furthermore, the lower portion of slider bars 402, 404, 406, and 408 correspond to lower numeric values associated with infrequent and/or mild degrees of a given category.

Also shown are control knobs 412, 414, 416, and 418, which correspond to respective scales 402, 404, 406, and 408. As indicated herein, if the content of a given media item exceeds the indicated objectionability threshold, the media item is blocked. Otherwise, the media item may be viewed. A user may slide each of control knobs 412, 414, 416, and 418 up or down to indicate objectionability thresholds. For example, if a user has a high tolerance for violence, the user may move control knob 414 upward. As such, in this particular example, more media items having violent content may be viewed based on the setting of control knob 414. In another example, if the user has a low tolerance for sex, the user may move control knob 414 downward. As such, in the example, more media items having violent content may be viewed based on the setting of control knob 414. Such slider bars and controls are beneficial in that there are finer degrees of control and infinite steps along each slider bar (in contrast from discrete, constrained, and limited ratings such as G, PG, etc.).

In some implementations, the system may enable a user to input training keywords and phrases, and other training information that the AI technology utilizes to identify content to be blocked from playing on the devices. For example, a user may decide that content directed by a particular director should be evaluated as higher on the "G" to "X" scale. This would have the effect of prohibiting children in the household to view movies by that particular director and would have the effect of yielding higher blocking ratings for such movies. This may not necessarily prohibit children from viewing an interview (e.g., would not yield higher blocking ratings for interviews) with the particular director (to the extent that such an interview does not exceed other blocking thresholds).

The particular number of categories and the particular labels for categories may vary, and will depend on the particular implementation. In some implementations, the system may enable the user to customize the categories. For example, in some implementations, the system may enable the user to add a new category, remove an existing category, modify the label of a particular category, etc. For any new category or existing category, the system enables the user to set an objectionability threshold by moving the control know of the slider bar associated with that particular category.

In various implementations, the AI may be trained with specific user biases, for example, to be more sensitive to specific language, or to sexual content, or even more specific details. Moreover, the AI may also take into account other supplied data such as metadata listing a description of the content, the actors, the directors, the first-broadcast date, etc.

In some implementations, the system may enable the user to set an objectionability threshold for a particular word. For example, the user may add a category with a narrow scope based on the word. In an example scenario, if the category or word is zombie, etc., the system may analyze content based on the meanings associated with zombies, etc. The user may then set the objectionability threshold by adjust the control knob of the associated slider bar. In some implementations, the word may also be a particular genre (e.g., horror, etc.). In another example, the system may enable the user to indicate a proper name (e.g., name of an actor, name of a director, name of a distributor etc.) and set the objectionability threshold for that name.

In various implementations, the system blocks media items accordingly, based on comparing the associated numerical value resulting from analysis of the media item with the unique preferences of the user. For example, if the user establishes a zombie category with an extremely low objectionability threshold, the system blocks media items that show zombies. If the user establishes a zombie category with a low-to-medium-range objectionability threshold, the system blocks media items that show some zombies.

Implementations described herein provide various benefits. For example, implementations improve content ratings for producers and distributors of media content. Implementations described herein also enable users to more accurately block particular media content based on specific user preferences. Implementations described herein enable efficient and configurable content blocking mechanisms without manual intervention, using various automated, configurable, AI mechanisms. Implementations may be applied to facilitate those who may be blind and/or hard of hearing to utilize the content blocking capability.

Figure 5:
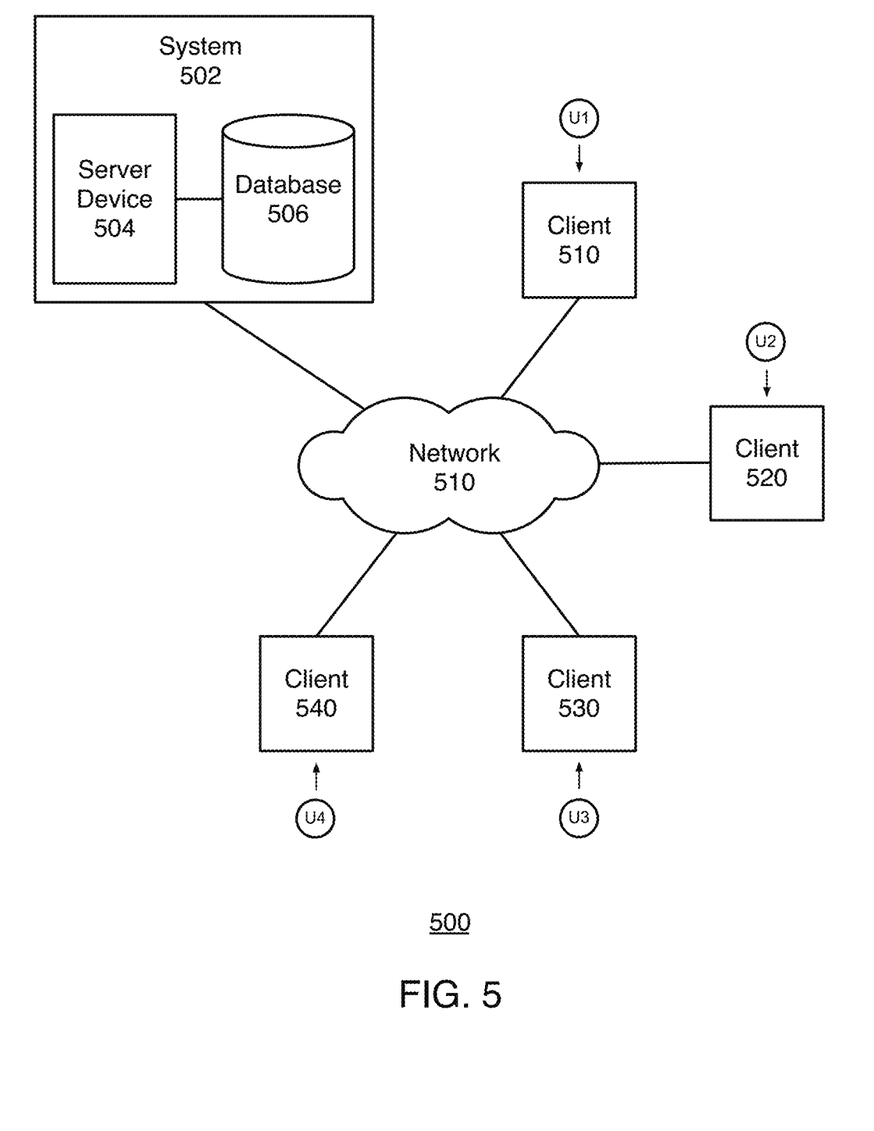
FIG. 5 is a block diagram of an example network environment, which may be used for some implementations described herein.

FIG. 5 is a block diagram of an example network environment 500, which may be used for implementations described herein. In some implementations, network environment 500 includes a system 502, which includes a server device 504 and a database 506. Network environment 500 also includes client devices 510, 520, 530, and 540, which may communicate with system 502 and/or may communicate with each other directly or via system 502. Network environment 500 also includes a network 550 through which system 502 and client devices 510, 520, 530, and 540 communicate. Network 550 may be any suitable communication network such as a Wi-Fi network, Bluetooth network, the Internet, etc.

In various implementations, system 502 may be used to implement media content provider system 102 of FIG. 1. Also, any of client devices 510, 520, 530, and 540 may be used to implement media device 104 of FIG. 1.

For ease of illustration, FIG. 5 shows one block for each of system 502, server device 504, and network database 506, and shows four blocks for client devices 510, 120, 530, and 540. Blocks 502, 504, and 506 may represent multiple systems, server devices, and databases. Also, there may be any number of client devices. In other implementations, network environment 500 may not have all of the components shown and/or may have other elements including other types of elements instead of, or in addition to, those shown herein.

While server 504 of system 502 performs embodiments described herein, in other embodiments, any suitable component or combination of components associated with server 502 or any suitable processor or processors associated with server 502 may facilitate performing the embodiments described herein.

In the various implementations described herein, a processor of system 502 and/or a processor of any client device 510, 520, 530, and 540 causes the elements described herein (e.g., content advisory recommendations, content ratings, user preferences, etc.) to be displayed in a user interface on one or more display screens.

Figure 6:
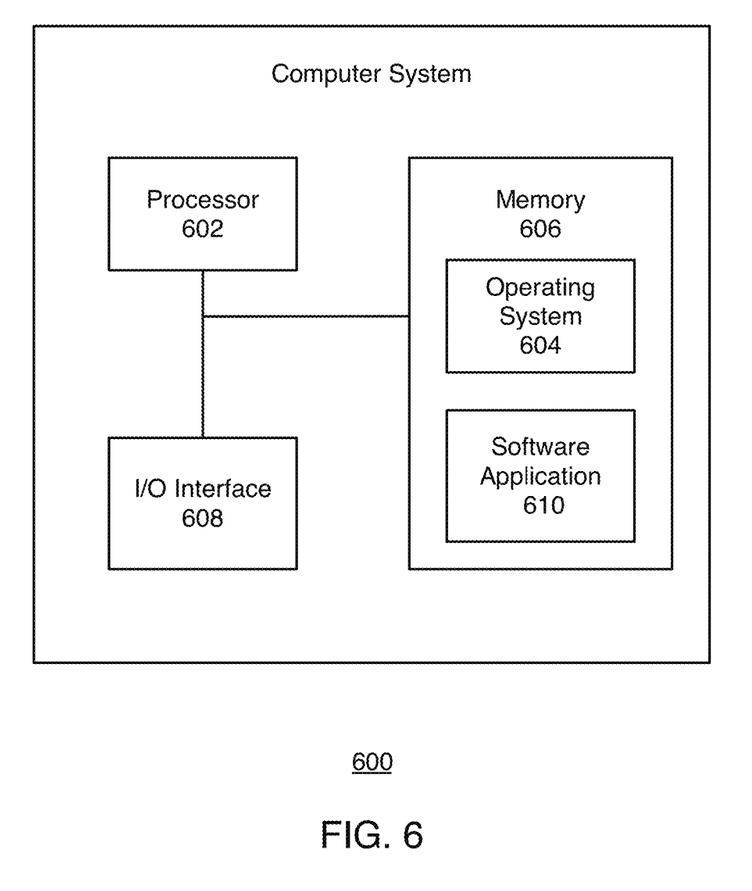
FIG. 6 is a block diagram of an example computer system, which may be used for some implementations described herein.

FIG. 6 is a block diagram of an example computer system 600, which may be used for some implementations described herein. For example, computer system 600 may be used to implement content provider system 102 and/or media device 104 of FIG. 1, as well as to perform implementations described herein. In some implementations, computer system 600 may include a processor 602, an operating system 604, a memory 606, an input/output (I/O) interface 608, and software application 610. In various implementations, processor 602 may be used to implement various functions and features described herein, as well as to perform the method implementations described herein. While processor 602 is described as performing implementations described herein, any suitable component or combination of components of computer system 600 or any suitable processor or processors associated with computer system 600 or any suitable system may perform the steps described. Implementations described herein may be carried out on a user device, on a server, or a combination of both.

Operating system 604 and software application 610 may be stored on memory 606 or on any other suitable storage location or computer-readable medium. Software application 610 provides instructions that enable processor 602 to perform the implementations described herein and other functions. Software application may also include an engine such as a network engine for performing various functions associated with one or more networks and network communications. The components of computer system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various implementations, computer system 600 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
receiving a media item at a media device;
accessing content information associated with the media item;
determining a plurality of content categories based on the content information, wherein the plurality of content categories comprises categories of potentially objectionable content;
analyzing the content information based on the plurality of content categories, wherein the analyzing of the content information comprises generating a plurality of values for the plurality of content categories, wherein each value of the plurality of values corresponds to a degree of objectionability;
obtaining an existing rating associated with the media item;
generating a content advisory recommendation associated with the media item based on the analyzing of the content information;
providing a plurality of control elements in a user interface of the media device;
enabling a user to set one or more objectionability thresholds using one or more control elements of the plurality of control elements, wherein one or more objectionability thresholds are based on a combination of the existing rating and the content advisory recommendation;
comparing analysis results from the analyzing of the content information to the one or more objectionability thresholds; and
blocking the media item from being played on the media device if the analysis results exceeds one or more objectionability thresholds of the one or more objectionability thresholds.

2. The system of claim 1, wherein the content information comprises video content and audio content.

3. The system of claim 1, wherein the content information comprises captions.

4. The system of claim 1, wherein the content information comprises metadata.

5. The system of claim 1, wherein the analyzing of the content information is based on one or more of artificial intelligence techniques, natural language processing techniques, and automated video processing techniques.

6. The system of claim 1, wherein each control element of the plurality of control elements is a slider.

7. A non-transitory computer-readable storage medium with program instructions stored thereon, the program instructions when executed by one or more processors are operable to cause the one or more processors to perform operations comprising:
receiving a media item at a media device;
accessing content information associated with the media item;
determining a plurality of content categories based on the content information, wherein the plurality of content categories comprises categories of potentially objectionable content;
analyzing the content information based on the plurality of content categories, wherein the analyzing of the content information comprises generating a plurality of values for the plurality of content categories, wherein each value of the plurality of values corresponds to a degree of objectionability;
obtaining an existing rating associated with the media item;
generating a content advisory recommendation associated with the media item based on the analyzing of the content information;
providing a plurality of control elements in a user interface of the media device;
enabling a user to set one or more objectionability thresholds using one or more control elements of the plurality of control elements, wherein one or more objectionability thresholds are based on a combination of the existing rating and the content advisory recommendation;
comparing analysis results from the analyzing of the content information to the one or more objectionability thresholds; and
blocking the media item from being played on the media device if the analysis results exceeds one or more objectionability thresholds of the one or more objectionability thresholds.

8. The computer-readable storage medium of claim 7, wherein the content information comprises video content and audio content.

9. The computer-readable storage medium of claim 7, wherein the content information comprises captions.

10. The computer-readable storage medium of claim 7, wherein the content information comprises metadata.

11. The computer-readable storage medium of claim 7, wherein the analyzing of the content information is based on one or more of artificial intelligence techniques, natural language processing techniques, and automated video processing techniques.

12. The computer-readable storage medium of claim 7, wherein each control element of the plurality of control elements is a slider.

13. A computer-implemented method comprising:
receiving a media item at a media device;
accessing content information associated with the media item;
determining a plurality of content categories based on the content information, wherein the plurality of content categories comprises categories of potentially objectionable content;
analyzing the content information based on the plurality of content categories, wherein the analyzing of the content information comprises generating a plurality of values for the plurality of content categories, wherein each value of the plurality of values corresponds to a degree of objectionability;

obtaining an existing rating associated with the media item;

generating a content advisory recommendation associated with the media item based on the analyzing of the content information;

providing a plurality of control elements in a user interface of the media device;

enabling a user to set one or more objectionability thresholds using one or more control elements of the plurality of control elements, wherein one or more objectionability thresholds are based on a combination of the existing rating and the content advisory recommendation;

comparing analysis results from the analyzing of the content information to the one or more objectionability thresholds; and blocking the media item from being played on the media device if the analysis results exceeds one or more objectionability thresholds of the one or more objectionability thresholds.

14. The method of claim 13, wherein the content information comprises video content and audio content.

15. The method of claim 13, wherein the content information comprises captions.

16. The method of claim 13, wherein the content information comprises metadata.

17. The method of claim 13, wherein the analyzing of the content information is based on one or more of artificial intelligence techniques, natural language processing techniques, and automated video processing techniques.

18. The method of claim 13, wherein each control element of the plurality of control elements is a slider.

* * * * *